United States Patent
Germuth-Löffler et al.

(10) Patent No.: US 6,459,389 B1
(45) Date of Patent: Oct. 1, 2002

(54) ADAPTIVE ABSOLUTE STEERING ANGLE SENSOR

(75) Inventors: Michael Germuth-Löffler, Aschaffenburg; Martin Spies, Hohenwart, both of (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/581,968

(22) PCT Filed: Dec. 17, 1998

(86) PCT No.: PCT/DE98/03776

§ 371 (c)(1),
(2), (4) Date: Jun. 19, 2000

(87) PCT Pub. No.: WO99/32345

PCT Pub. Date: Jul. 1, 1999

(30) Foreign Application Priority Data

Dec. 18, 1998 (DE) .......................... 197 58 104

(51) Int. Cl.[7] .............................. H03M 1/22; G01D 5/34
(52) U.S. Cl. ....................... 341/13; 250/231.18; 701/41
(58) Field of Search ..................... 341/13, 10; 250/231, 250/559, 231.13, 231.14; 701/41, 48; 33/356

(56) References Cited

U.S. PATENT DOCUMENTS

| 4,901,073 A | * | 2/1990 | Kibrick ........................ 341/13 |
| 5,065,324 A | * | 11/1991 | Oshita et al. .................. 701/41 |
| 5,369,583 A | * | 11/1994 | Hazelden ...................... 701/48 |
| 5,602,544 A | | 2/1997 | Takahashi et al. ............. 341/6 |

FOREIGN PATENT DOCUMENTS

| DE | 195 05 500 | 8/1995 |
| DE | 197 05 312 | 8/1998 |
| EP | 0 377 097 | 7/1990 |
| JP | 05-026688 | 2/1993 |
| WO | WO 93/25865 | 12/1993 |
| WO | WO 98/13669 | 4/1998 |

OTHER PUBLICATIONS

V. P. Halloin et al, "Hydraulische Linearantriebe in Werkzeugmaschinen", Antriebstrechnik, Apr. 1990, pp. 6, 9, 10 & 13, XP 000127500 (and English summary).

* cited by examiner

*Primary Examiner*—Patrick Wamsley
(74) *Attorney, Agent, or Firm*—Foley & Lardner

(57) ABSTRACT

The invention relates to an adaptive absolute steering sensor for the absolute determination of a turning angle, especially for determining the steering angle in a motor vehicle by way of a code applied across a 360° angular range for a determining the angle. The code and a sensor system are arranged in such a way that they are able to rotate in relation to each other. Absolute determination of the angle is carried out by reading the contrast information using a micro processor which determines both the angular position of the code and the fine resolution of the angles on the basis of the relative position of the recognized angle to the image on the photodetector system. At the same time the overall function of the system is verified and adjusted during each measurement. The code is determined using a photodetector system positioned in a single place, and used for determining the angle, whereby an unbroken segment of code track is shown on at least one photodetector line and at least one code word is detected to which corresponds a predetermined angle. The position of the code word in relation to the fixed position of the photodetector line is measured.

31 Claims, 12 Drawing Sheets

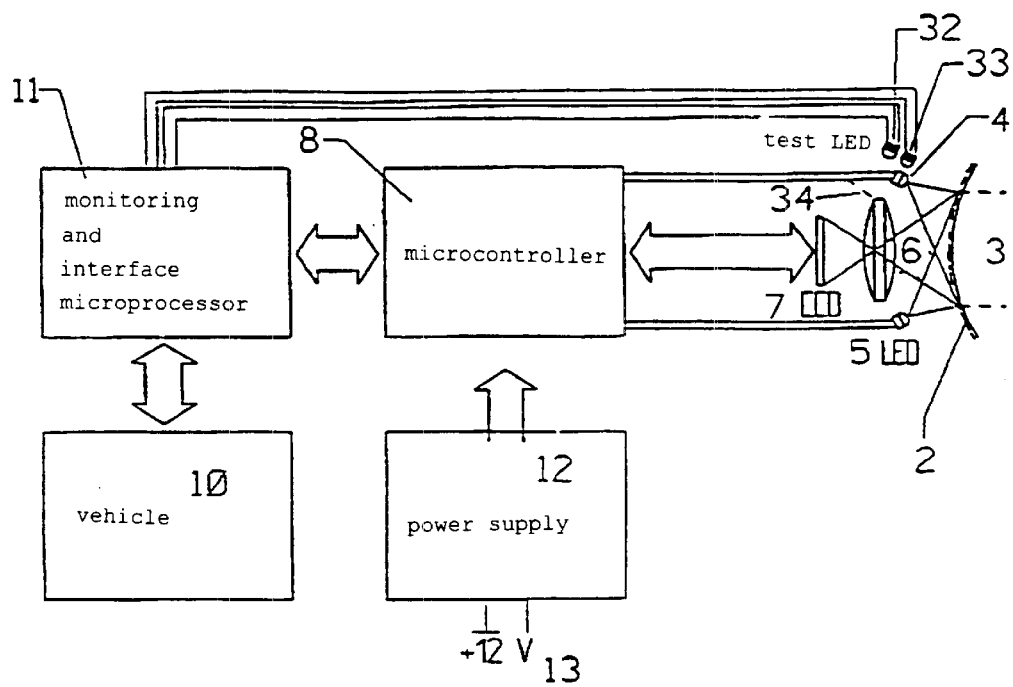
FIG. 3
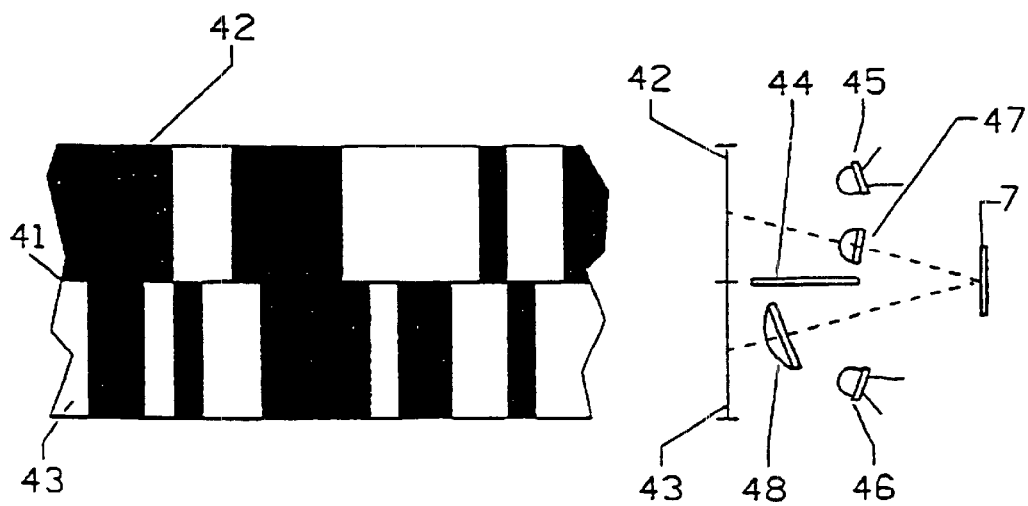
FIG. 4
FIG. 4a

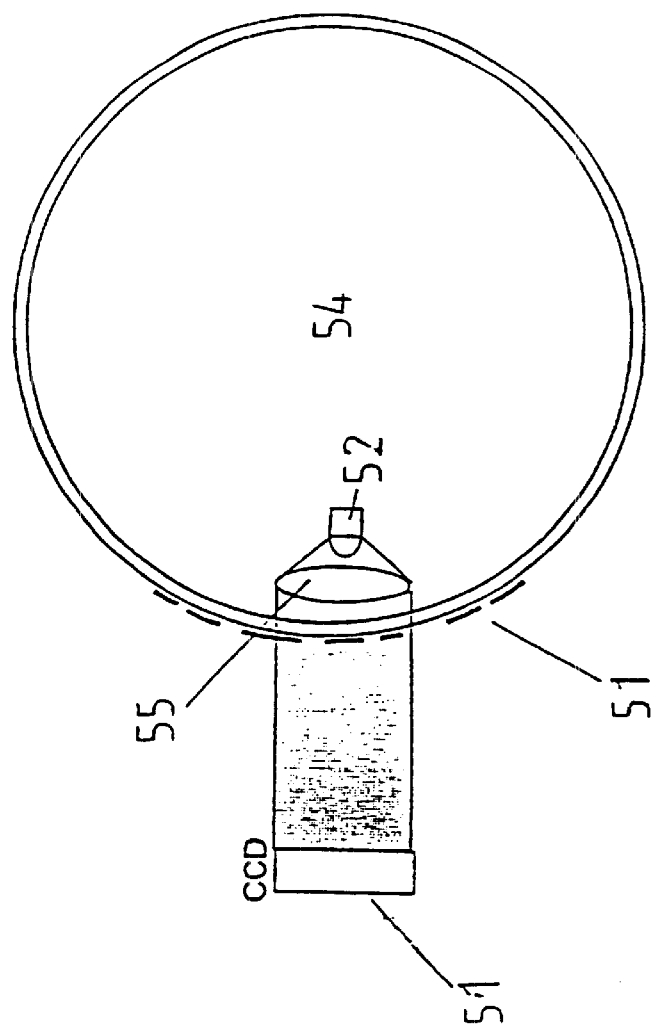
Fig. 5
Fig. 5a

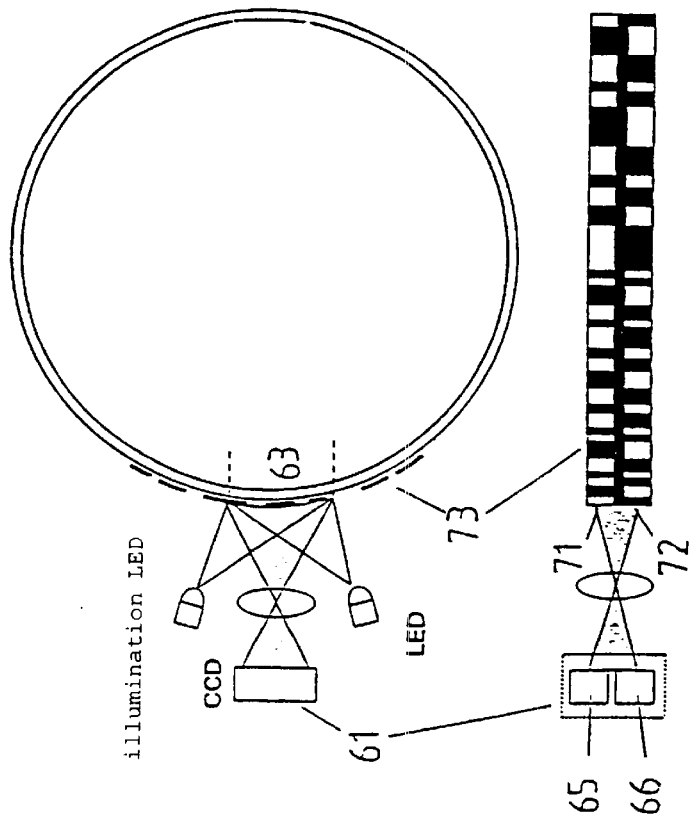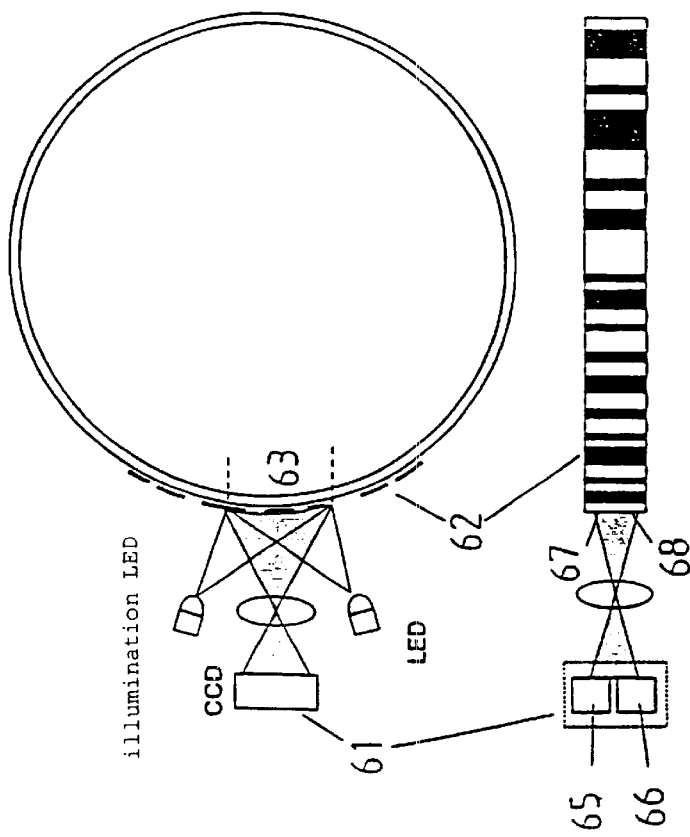

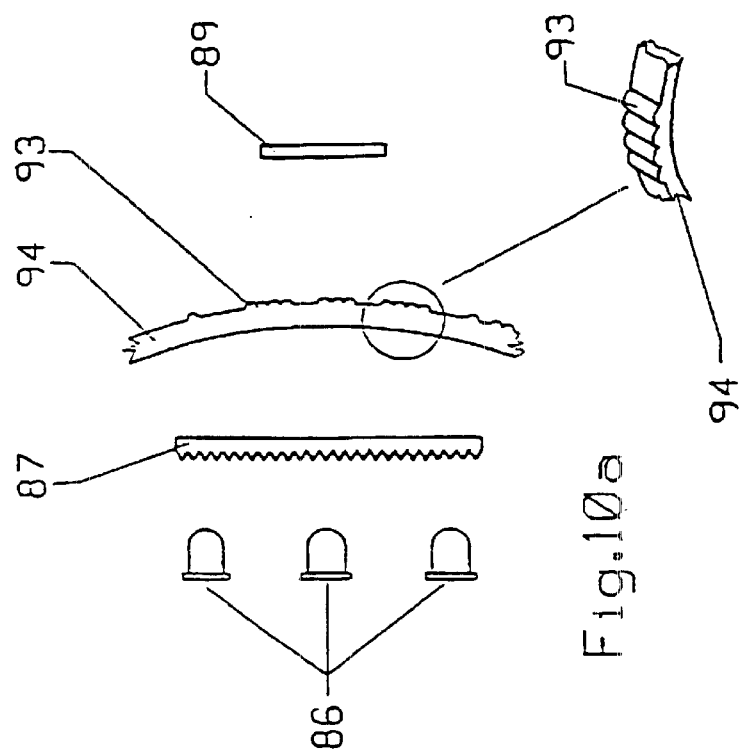
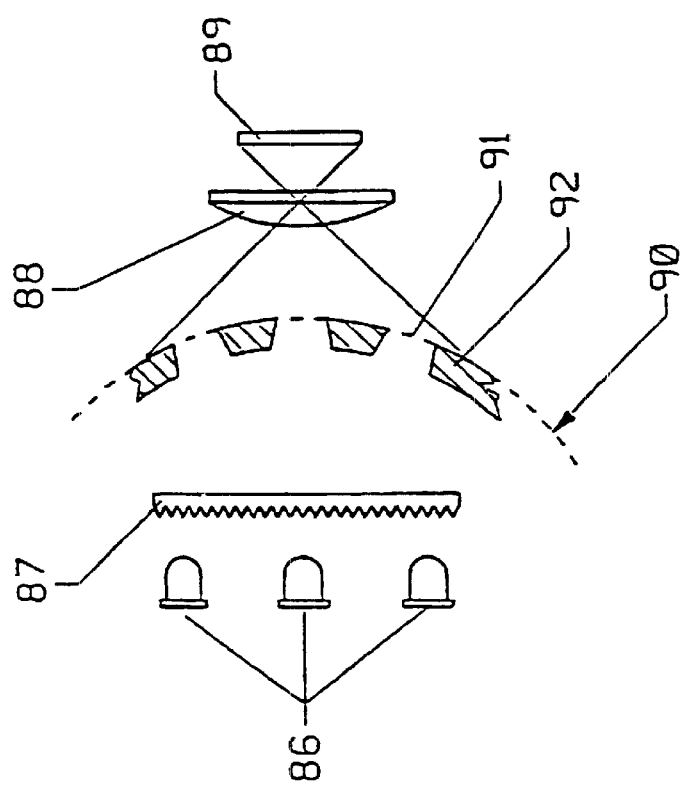

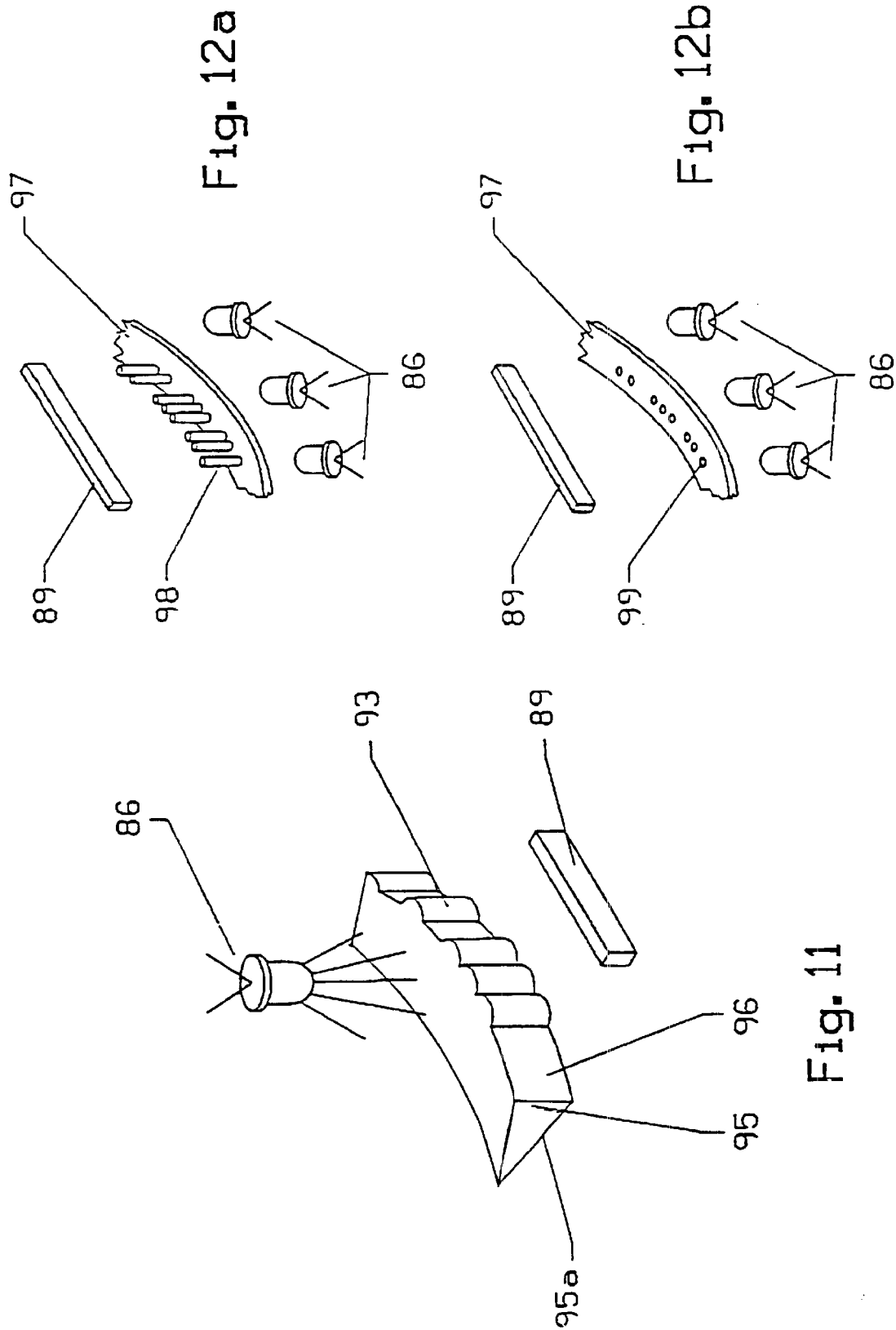

ADAPTIVE ABSOLUTE STEERING ANGLE SENSOR

The invention relates to an adaptive absolute steering angle sensor for absolute determination of an angle of rotation, in particular for determining the steering angle in a motor vehicle by means of a code, provided over an angular range of 360°, for determining the angle. The code and a detector arrangement are arranged such that they can rotate relative to one another. Absolute determination of the angle is effected by the contrast information being read by means of a microprocessor which determines both the angular position of the code and the fine resolution of the angles as a result of the relative position of the identified code with respect to the image on the photodetector arrangement. At the same time, the overall function of the system is checked and adapted during each measurement.

The invention is based on the object of further improving the determination of the absolute angular position of a rotor, in particular of the steering wheel of a motor vehicle.

According to the invention, the code is determined by means of a photodetector arrangement provided at a single location and is used for determination of the angle. Furthermore, a contiguous segment of the code track is imaged onto at least one photodetector linear array, where at least one code word is detected and a predetermined angle corresponding to said code word and the position of the code word with regard to a fixed position of the photodetector linear array is measured.

For this purpose, the code is chosen in such a way that it is not repeated over the entire circumference in the observation region of the photodetector arrangement. The code is in a single track, unambiguous and closed. The sensor has the advantage that, compared with known methods, the angular resolution does not depend on he resolution of the code of the code track and does not depend on the number of code words, but rather only on the resolution of the sensors of the photodetector arrangement. That is to say that the angular resolution is independent of the code. Without the use of a reference mark, the angular resolution depends on the number of code words. If at least one code word of the code track is detected by the photodetector arrangement, an angular resolution of 1° would be obtained given 360 code words.

Since the angular resolution does not depend on the number of code words, the fewest possible code words should be used, in order to reduce the sensor sensitivity to environmental influences, such as soiling. This is achieved, e.g., by the use of 6-bit or 7-bit codes instead of 8-bit codes.

The measurement is performed by software in a microcontroller which, for this purpose, uses the image data of the photodetector arrangement.

In order to increase the resolution further, at least two different images of one or more circumferential codes may be imaged onto the photodetector arrangement.

The code track may be transilluminated with parallel light or may be illuminated from one side.

In a further refinement, it is provided that the code is imaged onto the photodetector linear array via an optical arrangement in such a way that, with a reading cycle of the linear array, not only is the absolute angle information determined but also the overall function of the system is checked and adapted.

In order to monitor the system functions, at least one reference shadow image may be projected onto the photodetector linear array. In the event of soiling in the region of optical components, e.g., the power of the light sources can then easily be adapted by increasing the control current. The failure of individual detectors of the photodetector arrangement is also noted and can be compensated for by computational methods. The reference shadow images can be generated by corresponding software either cyclically or by a computer-controlled monitoring device being switched on individually.

Furthermore, it is possible that for the compensation of optical and mechanical tolerances, the edge steepness and image size of the signals imaged on the detector linear array are evaluated.

The angular range is determined within 0° to 360° by way of the traveling speed of the vehicle. In order to detect the absolute steering angle even with vehicle systems switched off, he steering angle is determined by briefly switching on the steering angle sensor in time intervals in which rotation of preferably greater than 180° is not possible.

By virtue of the fact that a single photodetector arrangement can very rapidly evaluate the angle in the range of 360°, the system is suitable by simple co-registration of the 360° exceedance and hence for a plurality of revolutions. In order to ensure that not only for the traveling mode, the system must be switched on momentarily in each case in the standby mode, the switched-on intervals being chosen in such a way that steering wheel rotation of greater than 360° is not possible in this interval. Since the system, for the purpose of data transmission, has an interface with the vehicle computer, the vehicle speed can be accepted from there, in order to define the zero range of the steering angle, since, in normal vehicles, no steering angle over, e.g., +/−90° from the zero position can be traveled above a certain speed.

In an adaptive absolute angle sensor, moreover, provision is made of at least one light source for illuminating an angular range of the code, and provision is made of a photodetector arrangement for detecting the illuminated angular range of the code, where a microcontroller is assigned to the light source and to the photodetector arrangement.

In a first embodiment, as a light source, two light-emitting diodes are arranged symmetrically with respect to the optical axis, these being provided together with the photodetector arrangement and an optical arrangement on the same side of the circular ring.

In a second embodiment, a circular coding ring which is optically transparent at light locations of the code is provided. Furthermore, at least one light-emitting diode is arranged on one side of he coding ring and the photodetector arrangement is arranged on the other side of the coding ring. An optical arrangement is preferably provided on the side of the light-emitting diode.

In order to increase the reliability of the angle sensor and in order to detect code errors, a further refinement provides for the photodetector arrangement to have two sensors, which are arranged vertically, one above the other with regard to the course of the code track for the synchronous observation thereof, and for the images of the two sensors to be compared with one another. The comparison of the two images makes it possible to identify local soiling particles (effecting the code or optical arrangement) and also sensor errors. Two linear array sensors or two portions of an area sensor lying one above the other can be provided as the sensors.

In a further refinement, two sensors are arranged horizontally next to one another for synchronous registering of adjacent code words of the code track.

Charge-coupled elements (CCD) are preferably provided as the photodetectors.

In order further to reduce the sensor sensitivity to environmental influences, the light-dark lines of the code words should have the largest possible dimensions. The light-dark lines of the code words preferably have a width of from 2 to 3 mm.

In ore embodiment, it is provided that a matte plate is arranged between the light source and the transparent coding ring, and that the optical arrangement and the photodetector arrangement are provided on the other side of the coding ring.

In a further embodiment, a transparent coding ring has, in portions, cylindrical lenses lying next to one another and serving to generate the code and image the light sources on the photodetector arrangement. An additional optical arrangement is obviated in this embodiment. Stripes of different brightness are produced on the photodetector array as a result of the cylindrical lenses.

In a further refinement, it is provided that the coding ring has a prismatic cross section, there being arranged a light source which radiates in the axial direction of the coding ring.

In a further embodiment, there are arranged on a transparent coding ring, in portions, cylinders or lenses lying next to one another and serving to generate the code and image the light sources on the photodetector arrangement, where the cylinders extend in the axial direction of the coding ring and are fixed by one end area on the coding ring and are assigned to the light sources and are assigned with their other, exposed end areas [sic] to the photodetector arrangement. By means of regions with and without cylinders and configuration of the density and respectively with and without lenses, a code can be applied and correspondingly detected. The exposed end areas of the cylinders are expediently plane or are of lenticular design.

In one embodiment, at least one point light source is assigned to the transparent coding ring, which has optically transparent regions and optically opaque regions. In a first refinement, two point light sources are provided next to one another at a constant distance and a single photodetector arrangement is provided. This arrangement has the advantage that despite the change in the radial distance of the coding ring due to radial runout of the steering wheel or despite a change in the distance between the components due to mechanical or thermal influences, on account of the different shadow formation of the two light sources whose distance remains constant, the position and angular position of the code on the photodetector arrangement can be detected accurately.

The same advantageous effect can be obtained as follows: one point light source and two photodetector linear arrays, which are arranged one above the other at different distances from the light source, are provided.

A further refinement provides for at least one reference code to be assigned to the angle-determining code on the coding ring. In this case, the reference code may be arranged next to the angle-determining code, or be provided above and below the angle-determining code.

BRIEF DESCRIPTION OF THE DRAWINGS

The invention will be explained using exemplary embodiments with reference to the drawings, in which:

FIG. 1a shows the plan view of a portion of the code track;

FIG. 3 shows an embodiment of the steering angle sensor in which a shadow image is additionally projected onto a CCD linear array;

FIG. 4 shows a plan view of a code with a coarse region and a fine region;

FIG. 4a shows a section through the code arrangement with associated optical assemblies;

FIG. 5 shows a transmitted-light variant of the steering angle sensor;

FIG. 5a shows the plan view of a portion of the code track;

FIG. 6 shows an embodiment of the steering angle sensor with two CCD linear arrays lying vertically one above the other, a code track being assigned to said CCD linear arrays;

FIG. 6a shows a side view of the embodiment of FIG. 6;

FIG. 7 shows an embodiment of the steering angle sensor with two CCD linear arrays lying vertically one above the other, a respective code track being assigned to said CCD linear arrays;

FIG. 7a shows a side view of the embodiment of FIG. 7;

FIG. 9 shows an embodiment with injection-molded codings in a plastic ring;

FIGS. 10a,b show an embodiment of the coding by means of cylindrical lenses;

FIG. 11 shows a coding ring with a prismatic cross section;

FIG. 12a shows a coding ring with cylinders;

FIG. 12b shows a coding ring with lenses arranged directly on it;

DETAILED DESCRIPTION

Figure 1:
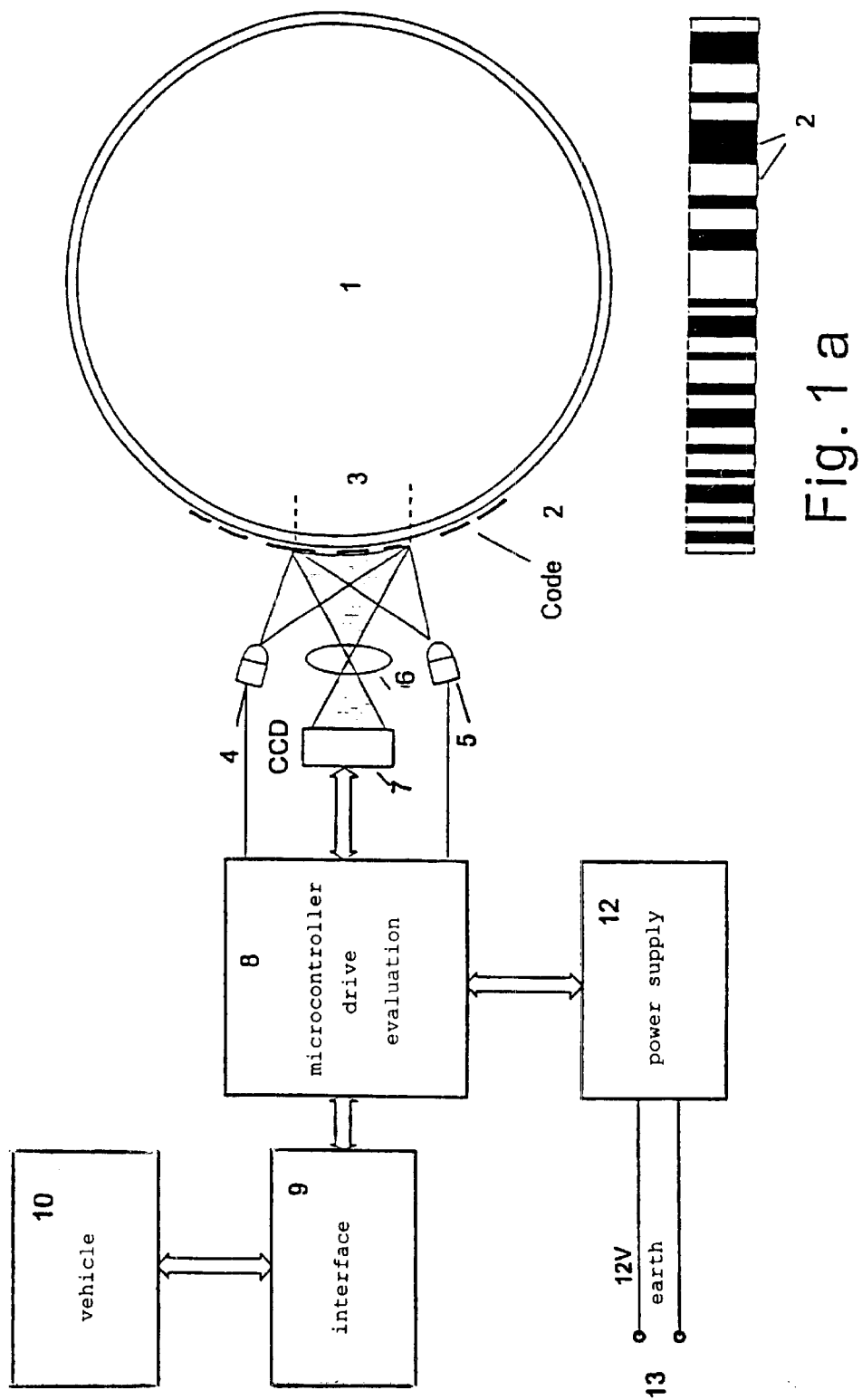
FIG. 1 shows the fundamental design of a steering angle sensor for carrying out the method according to the invention in a reflected-light variant.

A digital, single-track code 2 is applied on the circumference of a 360° rotatable circular ring 1 of a steering device. The code is configured in such a way that it is not repeated over the entire circumference or in an observation region 3. It can be referred to as single-track, unambiguous and closed. This single-track code thus suffices for determining the absolute steering angle within 360°.

The observation region 3 is illuminated by light-emitting diodes 4 and 5 and imaged onto a photodetector linear array 7 via an optical arrangement 6. The said photodetector linear array is embodied as a charge-coupled detector linear array (CCD linear array). The code 2 in the observation region 3 is embodied as a black-and-white code in accordance with FIG. 1a. The code. is passed as a contrast difference from the photodetector linear array to a microcontroller 8. The latter evaluates the contrast differences, decodes them and forwards the angle-of-rotation position to the vehicle 10 via an interface 9.

The entire unit is supplied from the 12-volt vehicle electrical system 13 via a power supply 12.

In order to detect the angular position, in this method a contiguous segment of the code track, namely the observation region 3, is imaged onto the photodetector linear array 7. Within 0 to 360°, the absolute steering angle can be unambiguously determined with a resolution that depends on the code chosen. The observation region is chosen in such a way that at least one code word 29 (FIG. 2) of the code track is detected by the CCD linear array 7. Each code word corresponds to a steering angle, the angular resolution depending on the number of code words. A resolution of 1° is obtained given 360 code words. A coarse angle is determined in this way.

In this method, a high resolution, that is to say fine angle determination, is obtained independently of the resolution of the code of the code track and the number of code words. To that end, in accordance with FIG. 2, in the observation region 3, the position of the start 25 and of the end 26 of a code word 29 is measured with regard to a fixed reference mark 28 of the stationary photodetector. The reference mark is provided at pixel No. 64 in this exemplary embodiment. The measurement is performed purely by software in the microcontroller 8, which uses the image data of the photodetector linear array 7 for this purpose.

The position 27 of the code word with regard to the reference mark 28 of the photodetector linear array 7, measured with the resolution of the photodetector, is obtained as a result. The position or the distance of the code word with respect to the reference mark and thus the angular resolution of the steering angle sensor is thus dependent only on the resolution with which the photodetector linear array resolves the observation region. In the exemplary embodiment, the photodetector linear array has 128 pixels, as a result of which steering angle resolutions of <0.20 are achieved. The absolute angle is thus composed of the code word and the position. of the code word with respect to the photodetector linear array.

Since, presupposing that the observation region 3 detects at least one code word, the resolution of the steering angle sensor depends only on the resolution of the photodetector linear array, the light/dark lines of the code word can have large dimensions, e.g., 2–3 mm. It is expedient to use a code having the fewest possible code words. This is achieved, e.g., by the use of 6-bit or 7-bit codes instead of, e.g., 8-bit codes. The sensor sensitivity to environmental influences, e.g., soiling, is thereby reduced.

Figure 2:
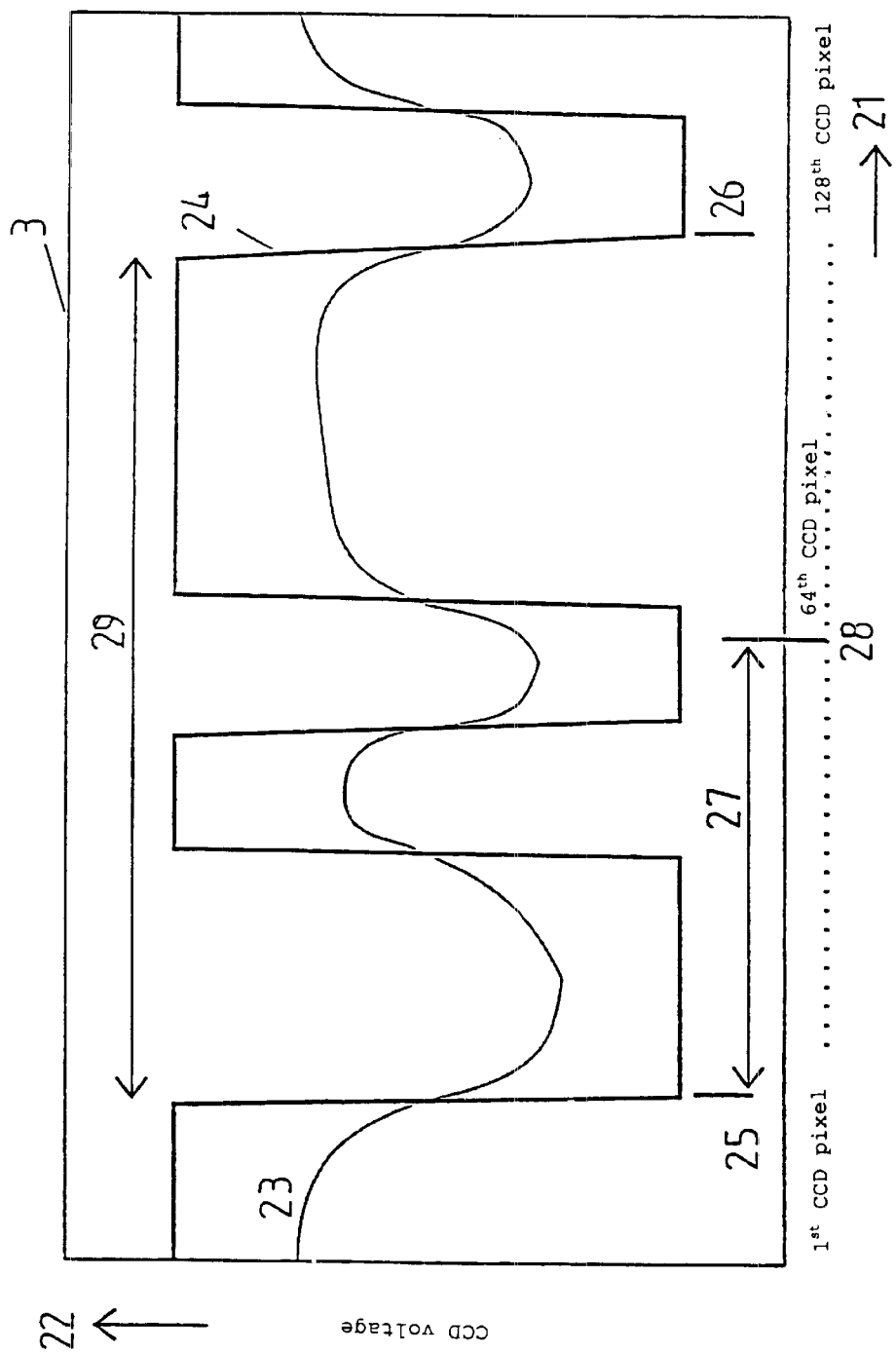
FIG. 2 shows the assignment of the photosensitive cells of a CCD linear array to the voltage amplitudes.

In FIG. 2, the linear assignment of the photosensitive cells of the CCD linear array in the observation region is represented on the x-axis 21 and the associated voltage amplitudes are represented on the y-axis 22. If the code in the observation region 3 is imaged onto the photodetector linear array 7 very well, very distinct contrast differences with correspondingly sharp demarcations are produced. If the imaging is unsharp on account of an excessively large radial tolerance or owing to soiling, the photodetector linear array 7 produces a rough signal whose profile corresponds to the graph 23. The code is reconstructed by known curve analysis and assessment in the microcontroller 8, so that the signal train 24 is then present. As a result of the evaluation of the amplitudes as a function of the number of photodetectors of the photodetector linear array 7, it is possible, in the event of progressive soiling or in the event of aging of the components, for the gain to be increased or for the luminance at the diodes 4 and 5 to be set in a correspondingly adaptive fashion. These settings can also be adapted over the circumference or the observation region. Axial tolerances are compensated for simply by way of the height of the code track 2.

In order to increase the sensitivity further, the steering angle sensor can be configured further in accordance with FIGS. 4 and 4a. The code on a circumference 41 is divided into an upper coarse region 42 for identification of the 0 to 360° and into a lower fine region 43. The coarse code region 42 illuminated by means of a light-emitting diode 45 is imaged onto the photodetector linear array 7 via an optical arrangement 47 for the purpose of determining the coarse angle. Afterward, the fine code region 43 is illuminated by means of a light-emitting diode 46 and a smaller detail is imaged onto the photodetector linear array 7 via an optical arrangement 48. This smaller detail may in turn comprise a code covering +/–10°. The two optical arrangements are separated by a diaphragm 44. The imaging of a smaller detail enables the resolution and accuracy to be correspondingly increased.

A further embodiment of the steering angle sensor is illustrated in FIG. 3. The arrangement corresponds to that of FIG. 1, but a monitoring and interface microprocessor 11 is provided for the purpose of testing the entire system, in which microprocessor software is installed which either in the event of switch-on and/or cyclically switches on, one or more light-emitting diodes 32 and 33 are imaged onto the photodetector linear array 7 via a mask 34. As a result of the diodes 32 and 33 being switched on sequentially, a shadow image or a plurality of shadow images are generated successively on the photodetector linear array. As a result, the function of the entire arrangement can be tested via all the components. In the event of soiling in the region of the optical components, e.g., the optical power of the light-emitting diodes 4 and 5 can then easily be adapted by correspondingly increasing the control current. The failure of individual detectors of the photodetector linear array is also noted and can be compensated for by computational measures.

Throughout the operating time in which the measurements of the steering angle take place, it is possible, by evaluation of the rise and fall times of the signals in accordance with FIG. 2, of the amplitudes of the signals and also of the imaging of the code 2, not only to monitor the entire system in the sense of diagnosis but also to compensate for tolerances and to attain the accuracy over virtually all operational influences.

Whereas FIG. 1 illustrates an embodiment of the steering angle sensor which operates with reflected light, FIG. 5 shows a sensor which operates with transmitted light. In this case, a circular ring 54 is optically transparent in the region of the light lines: of a code 53. A light-emitting diode 52 and an optical arrangement 55 are arranged inside the ring. A photodetector linear array 51 is assigned to said diode and optical arrangement outside the circular ring. The code 53 in accordance with FIG. 5a corresponds to the code of FIG. 1a. The code track is transilluminated with parallel light in this case.

In the exemplary embodiment of FIGS. 6 and 6a, a provision is made of two linear array sensors 65 and 66, which observe the same code track 62 at different points. Both are arranged vertically with regard to the course of the code track and detect the observation region 63 synchronously but at different positions 67, 68.

As a result of the comparison of the two images, local soiling particles, e.g., on the code or optical arrangement, and also sensor errors can be identified. Instead of two single-row linear array sensors 65 and 66, it is also possible to use an area sensor 61 for this function.

In the exemplary embodiment of FIGS. 7 and 7a, a code 73 with two tracks 71, 72 is provided, as is evident from FIG. 7a. Each of the two code tracks is observed by a linear array sensor 65, 66 or different linear arrays of an area sensor 61. The code of the second code track may then be, for example, the inverse of that of the first code track, thereby resulting in simple control of the sensor input by simple subtraction of the measured values in the microcontroller 8.

Figure 8:
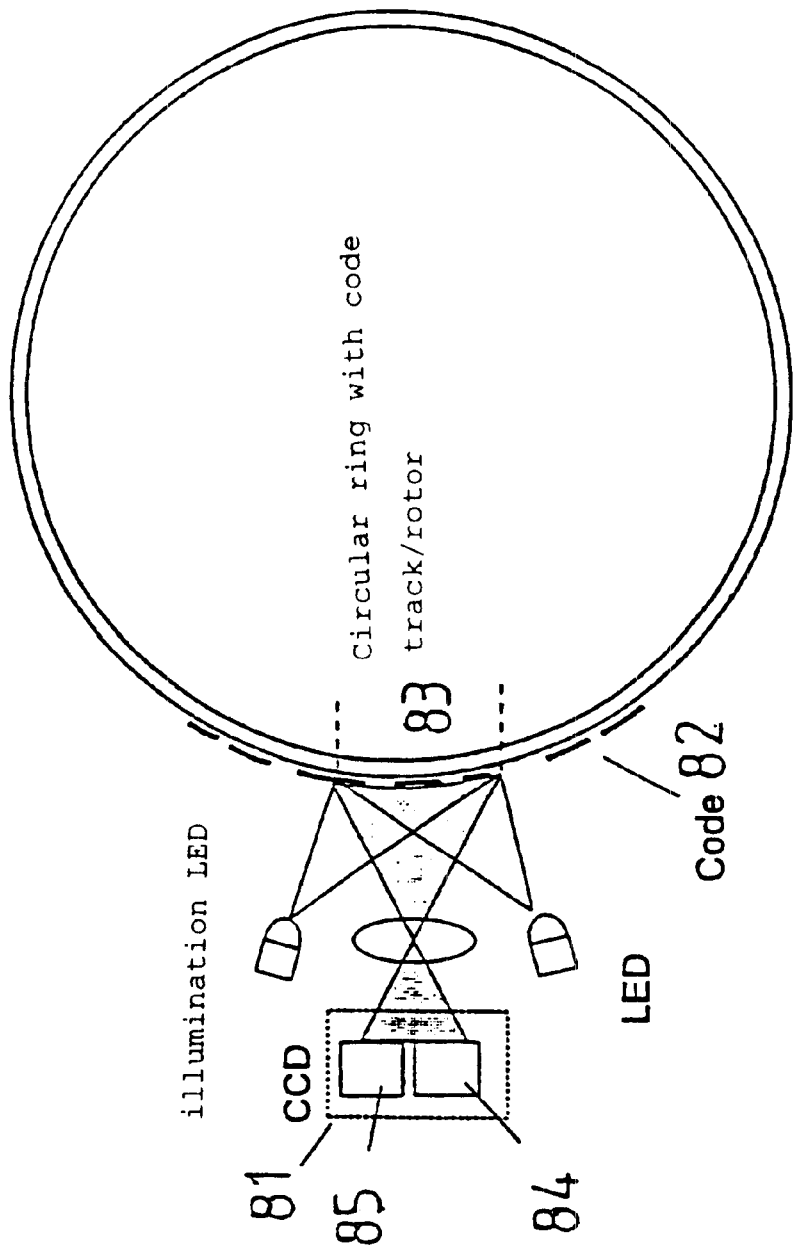
FIG. 8 shows an embodiment of the steering angle sensor with two CCD linear arrays lying horizontally next to one another.

A further arrangement is illustrated in FIG. 8. In order to increase the sensor reliability, a second CCD sensor 85 is positioned horizontally next to the first CCD sensor 84 in this exemplary embodiment. As a result of the horizontal arrangement different code words are registered at two different locations of the code track 82. The difference between the measurement results of the two CCD sensors must produce the differential observation angle of the two photodetectors with respect to the code track. This angle is known on account of the position of the CCD sensors.

Instead of a second CCD sensor, it is also possible to use a correspondingly larger linear CCD sensor. Furthermore, it is possible to combine two photodetector linear arrays in an integrated circuit 81 with a common housing.

In the exemplary embodiment of FIG. 9, one or more LEDs 86 are imaged onto a photodetector arrangement 89 via an optical arrangement 88 directly or via a matte plate 87. The coding consists of a ring 90 in which optically transparent angular ranges 91 and optically opaque angular ranges 92 are produced by injection-molded recesses or by correspondingly optically transparent and optically opaque plastics.

In the exemplary embodiment of FIGS. 10a and b, one or more LEDs 86 are imaged on the photodetector array 89 directly or via the matte plate 87 or Fresnel lens by means of an arrangement of identical or differently configured cylindrical lenses 93 without a further optical arrangement. The cylindrical lenses 93 produce stripes of different brightness on the photodetector arrangement 89. A corresponding code serving to sense the steering angle is generated by corresponding arrangement and distribution of the cylindrical lenses 93 on the coding ring 94, which is produced from a transparent medium. The arrangement of the cylindrical lenses is shown in FIG. 10b. Instead of the imaging of the LEDs onto a matte plate as in FIGS. 9 and 10, a coding ring 95 may be embodied in such a way that it comprises a prismatic arrangement in which one or more LEDs 86 irradiate the arrangement, e.g., axially (FIG. 11). The light beams are deflected at the hypotenuse 95a of the prism. The radial light emergence at the circumference of the coding ring 95 is configured in such a way that quasi-plane areal regions 96 and cylindrical lens arrangements 93 are situated there. The plane areas produce homogeneous light emergence onto the radially fitted photodetector arrangement 89. The cylindrical lenses 93 produce regions of low and high luminance on the photodetector arrangement 89. The coding for the purpose of steering angle determination is effected by corresponding distribution of the quasi-plane areas and by the identically or differently configured cylindrical lenses.

In a further embodiment according to FIG. 12a, light is radiated in the axial direction by means of LEDs 86 into a transparent coding ring 97 and this coding ring has a number of cylinders 98 which, at one end, are connected directly to the coding ring and, at the other end, are configured either in a plane or lenticular manner. As a result, a corresponding luminance which can be detected by means of the photodetector arrangement 89 will occur at each of these cylinders. By means of regions with and without cylinders and configuration of the density, a code can be applied and correspondingly detected. A variant of this embodiment is shown by FIG. 12b, in the case of which, instead of the cylinders 98, lenses 99 are provided directly on the coding ring 97. The effect corresponds to that of the arrangement with cylinders described above.

In addition to the embodiments which are shown in the figures and serve as an example of the design according to the invention, the arrangements can be configured in radial or axial form, where the direction of the passage of the light can be chosen in both possible directions.

Figure 13:
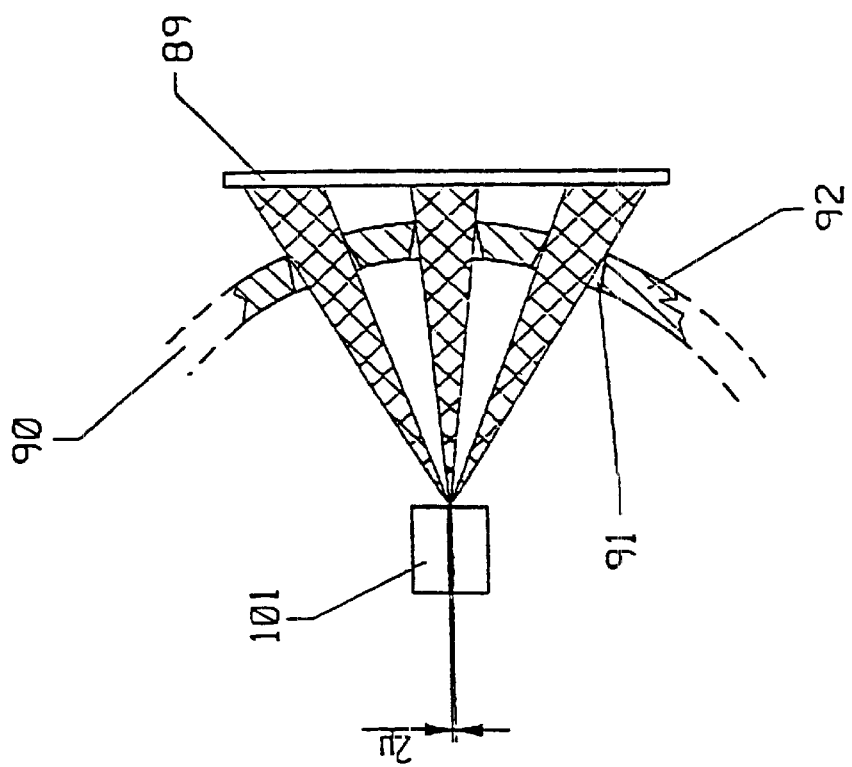
FIG. 13 shows a coding ring with a laser diode as the light source.

In the exemplary embodiment of FIG. 13, a lens arrangement is not necessary. A virtually point light source, e.g., by the use of a laser diode 101 with a light-emitting area of, e.g., 2 $\mu$x3 $\mu$with the depletion layer, e.g., parallel to the axis, illuminates the coding ring 90, which comprises the optically transparent regions 91 and the optically opaque regions 92. Provided downstream of the coding ring 90 is a linear photodetector arrangement 89, on which a luminance distribution is produced by the coding in the case of the optically transparent regions. This luminance distribution is evaluated.

Figure 14A:
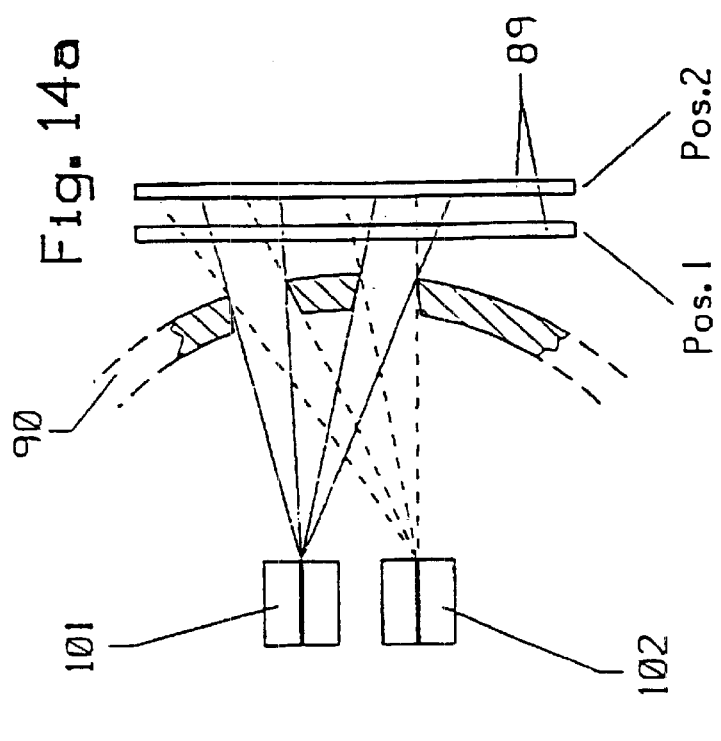
FIGS. 14a,b show a coding ring with two laser diodes as the light source.
Figure 14B:
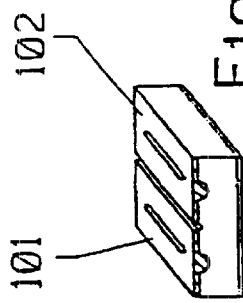

The arrangement according to FIG. 13 can be improved by using two laser diodes 101 and 102 provided next to one another at a known distance, as is illustrated in FIGS. 14a and b. The evaluation is effected in the manner described for the embodiment of FIG. 13. However, if the radial distance of the coding ring 90 changes due to radial runout of the steering wheel or if the distance between the components changes due to mechanical or thermal influences, this being indicated by positions 1 and 2 of the photodetector arrangement in FIG. 14a, then the position and angular position of the code can nevertheless be detected accurately on the photodetector arrangement 89 as a result of the different shadow formation of the two laser diodes 101 and 102 whose distance remains constant. In this case, the laser diodes 101 and 102 can be rapidly excited one after the other, the time being chosen to be short enough, e.g., 10 $\mu$s–100 $\mu$s, that an accuracy-limiting angular change does not occur at the steering wheel in this time. Instead of the laser diodes, it is also possible, of course, to use a monolithic LED in a double or triple arrangement, in which light-emitting areas with a very small extent in the axial direction are produced by means of corresponding masks.

Figure 15B:
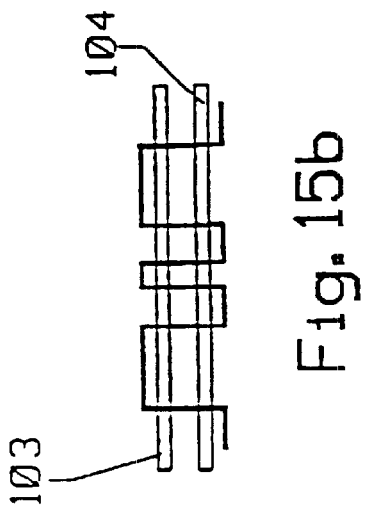
FIGS. 15a,b show a coding ring with one laser diode and two CCD linear arrays arranged downstream.
Figure 15A:
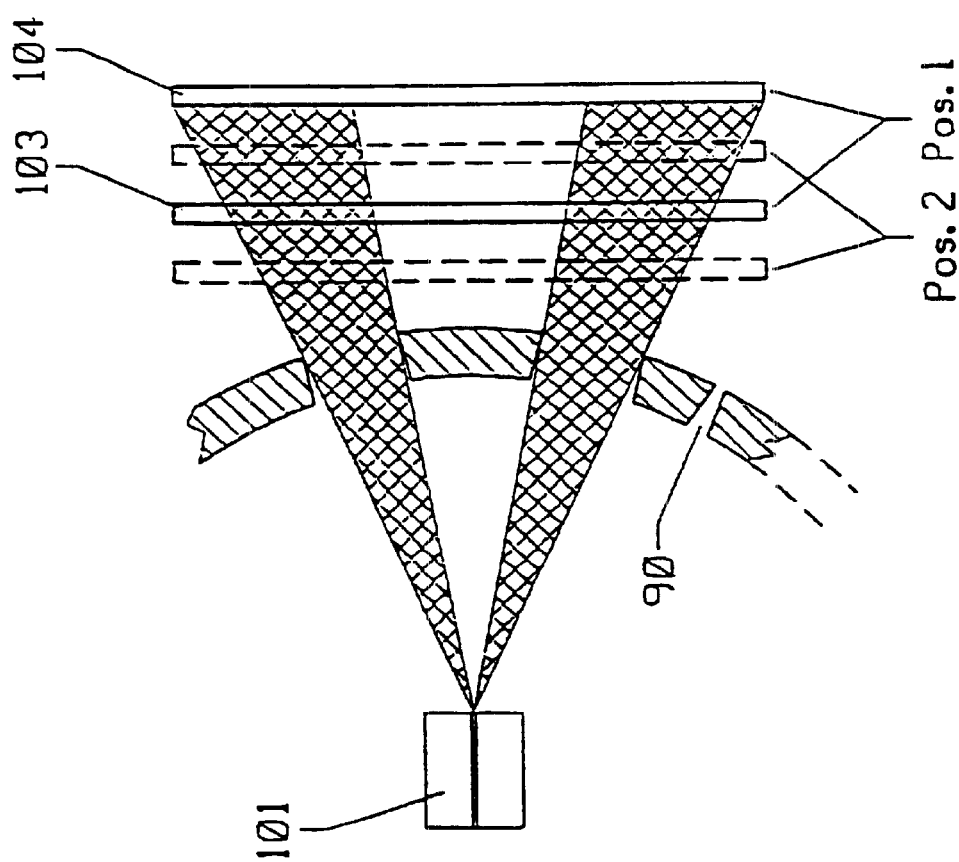

The same effect is also obtained by using a single laser diode 101 or LED, in which shadow imaging is effected on two photodetector linear arrays 103 and 104 fitted at different distances from the code ring 90 (FIGS. 15a and 15b). The code can be determined accurately by virtue of the conditions of the shadow structure. The distance of the code ring in the event of axial runout is determined by means of the absolute extent of the code on the photodetector linear arrays.

Figure 16:
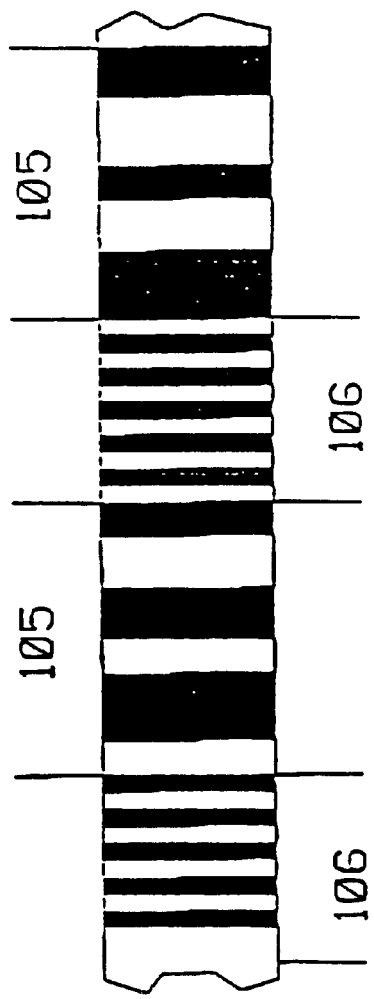
FIG. 16 shows the combination of an angle-determining code with a reference code lying next to it.

The embodiment of FIG. 16 shows a combination of an angle-determining code 105 with a reference code 106. By way of the projection of the code over a length which covers at least the angle code and the reference code, not only can the angle be evaluated, but also, on the one hand, the CCD or the photodetector arrangement can be tested by way of the reference code and, on the other hand, the distance and the exact angle can be determined by way of the known distances of the reference code.

Figure 17:
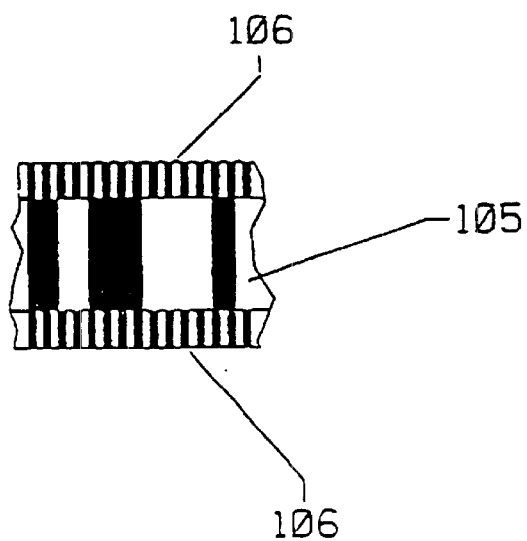
FIG. 17 shows the combination of an angle-determining code with a reference code lying above it and below it.

The angle-determining code 105 can also be applied parallel to the reference code 106, as is illustrated in FIG. 17. If the reference code 106 is applied at the top and bottom on the edge of the angle codings, in the manner shown here, then an axial tolerance does not affect the imaging of the reference code 106.

Figure 18:
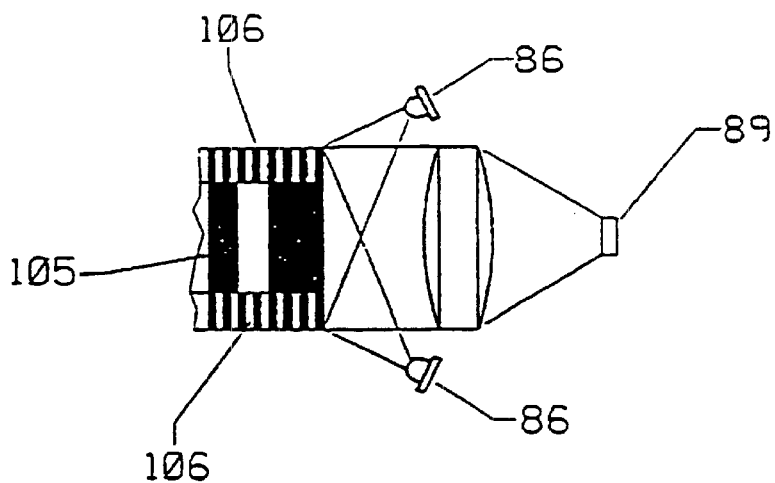
FIG. 18 shows the assignment of the illumination and the CCD linear array to the combination according to FIG. 17.
Figure 19:
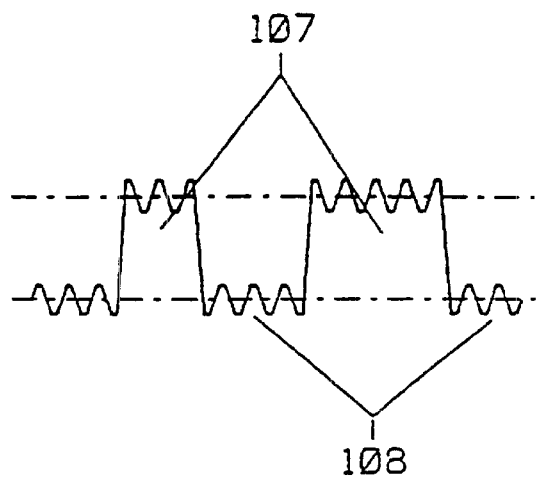
FIG. 19 shows the signal generated by the arrangement according to FIG. 19.

The two codes can be jointly imaged and illuminated by means of LEDs 86, as is evident from FIG. 18. As a result, at the photodetector arrangement 89, an angle signal 107 and a reference signal 108 in accordance with FIG. 19 can be generated and evaluated.

What is claimed is:

1. Adaptive absolute steering angle sensor device for absolute determination of an angle of rotation for a motor vehicle, the device comprising:
   a code track including a code provided over an angular range of 360°;
   a photodetector arrangement arranged with the code, such that the code and photodetector arrangement rotate relative to one another
   a microcontroller reading contrast information in the code to determine an angular position of the code and a fine resolution of the angular position of the code as a result of a relative position of the code with respect to an image on the photodetector arrangement;
   wherein the photodetector arrangement is provided at a single location and includes a photodetector linear array and an optical arrangement
   wherein the optical arrangement images a contiguous segment of the code track onto the photodetector linear array to detect a code word and a predetermined angle corresponding to said code word, by measuring a position of the code word with regard to a fixed position of the photodetector linear array, such that, within a reading cycle of the photodetector linear array, the absolute determination of the angle of rotation is determined and overall function of the sensor device is checked and adapted, and, in order to monitor the functions of the sensor device, a reference shadow image is projected onto the photodetector linear array.

2. Adaptive absolute angle sensor device
   according to claim 1 further comprising at least one light source for illuminating an angular range of the code; and wherein the photodetector arrangement detects the illuminated angular range of the code and the microcontroller is assigned to the at least one light source and to the photodetector arrangement.

3. Adaptive absolute angle sensor device according to claim 2 further comprising a transparent coding ring having cylinders or lenses adjacent to each other, such that the code and the at least one light source are imaged on the photodetector arrangement;
   wherein the cylinders extend in an axial direction of the coding ring and each cylinder has one end area fixed to the coding ring and assigned to the at least one light source and an exposed end area assigned to the photodetector arrangement.

4. Adaptive absolute angle sensor device according to claim 3 wherein the exposed end area of each cylinder are planer.

5. Adaptive absolute angle sensor device according to claim 3 wherein the exposed end area of each cylinder are lenticular.

6. Adaptive absolute angle sensor device according to claim 2 further comprising a circular coding ring optically transparent at light locations in which the code is provided, such that at least one light-emitting diode is arranged on one side of the circular coding ring and the photodetector arrangement is arranged on the other side of the circular coding ring.

7. Adaptive absolute angle sensor device according to claim 6 further comprising an optical arrangement provided on the one side of the circular coding ring.

8. Adaptive absolute angle sensor device according to claim 2 further comprising a coding ring; and
   wherein the at least one light source includes two light-emitting diodes arranged symmetrically with respect to the two light-emitting diodes arranged together with the photodetector arrangement and the optical arrangement on a same side of the coding ring.

9. Adaptive absolute angle sensor device according to claim 1 wherein the photodetector arrangement has two sensors arranged vertically one above the other with regard to a course of the code track for synchronous observation thereof, and such that images of the two sensors are compared with one another.

10. Adaptive absolute angle sensor device according to claim 9 wherein the two sensors are two linear array sensors lying one above the other.

11. Adaptive absolute angle sensor device according to claim 9 wherein the two sensors are two portions of an area sensor lying one above the other.

12. Adaptive absolute angle sensor device according to claim 1 further comprising:
    a transparent coding ring; and
    at least one point light source assigned to the transparent coding ring, the transparent coding ring having optically transparent region and optically opaque regions.

13. Adaptive absolute angle sensor device according to claim 12 wherein the at least one point light source includes two point light sources provided next to one another at a constant distance.

14. Adaptive absolute angle sensor device according to claim 12 further comprising two photodetector linear arrays arranged one above the other at different distances from the at least one point light source.

15. Adaptive absolute angle sensor device according to claim 1 further comprising at least one reference code assigned to the code.

16. Adaptive absolute angle sensor device according to claim 15 wherein the at least one reference code is arranged next to the code.

17. Adaptive absolute angle sensor device according to claim 15 wherein the at least one reference code is arranged above and below the code.

18. Adaptive absolute steering angle sensor device according to claim 1, wherein the microcontroller is configured with software which uses image data from the photodetector linear array to determine each measurement.

19. Adaptive absolute steering angle sensor device according to claim 1 or 18 further comprising at least two different images of one or more circumferential codes that are imaged onto the photodetector linear array to increase resolution.

20. Adaptive absolute steering angle sensor device according to claim 1 wherein said code word is a 6-bit or 7-bit code word.

21. Adaptive absolute steering angle sensor device according to claim 1 wherein the code track is transilluminated with parallel light.

22. Adaptive absolute steering angle sensor device according to claim 1 wherein the microcontroller evaluates edge steepness and image size of the code imaged on the photodetector linear array to compensate for optical and mechanical tolerances.

23. Adaptive absolute steering angle sensor device according to claim 1 wherein the angular range is determined within 0° to 360° based on traveling speed of the motor vehicle.

24. Adaptive absolute steering angle sensor device according to claim 1 wherein the sensor device determines the angle of rotation of the steering angle by briefly switching on the sensor device in time intervals where the angle of rotation being greater than 180° is not possible and when systems of the motor vehicle are switched off.

25. Adaptive absolute angle sensor device according to claim 1 further comprising two sensors arranged horizontally next to one another for synchronous registering of adjacent code words of the code track.

26. Adaptive absolute angle sensor device according to claim 1 wherein the photodetector arrangement includes charge-coupled elements (CCD).

27. Adaptive absolute angle sensor device according to claim 1 wherein the code words include light-dark lines having a width of 2 to 3 millimeters.

28. Adaptive absolute angle sensor device according to claim 1 further comprising a light source;

a coding ring; and a matte plate arranged between the light source and the coding ring such that the optical arrangement and the photodetector arrangement are provided on one side of the coding ring.

29. Adaptive absolute angle sensor device according to claim 1 further comprising a transparent coding ring having cylindrical lenses adjacent to each other to generate the code and image a light source on the photodetector arrangement.

30. Adaptive absolute angle sensor device according to claim 1 further comprising:

a coding ring having a prismatic cross section; and a light source which radiates in an axial direction of the coding ring.

31. Adaptive absolute steering angle sensor device according to claim 1 wherein the code is illuminated from one side.

* * * * *